(12) United States Patent
Kim

(10) Patent No.: US 8,446,888 B2
(45) Date of Patent: May 21, 2013

(54) MOBILE COMMUNICATION SYSTEMS AND RANGING METHODS THEREOF

(75) Inventor: Min-Q Kim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 798 days.

(21) Appl. No.: 12/233,990

(22) Filed: Sep. 19, 2008

(65) Prior Publication Data

US 2009/0080501 A1    Mar. 26, 2009

(30) Foreign Application Priority Data

Sep. 21, 2007  (KR) .......................... 10-2007-0096337

(51) Int. Cl.
*H04W 4/00*  (2009.01)

(52) U.S. Cl.
USPC .......................................................... 370/338

(58) Field of Classification Search
USPC .......................................................... 370/338
See application file for complete search history.

(56) References Cited

U.S. PATENT DOCUMENTS

| 6,453,168 | B1 * | 9/2002 | McCrady et al. ............. 455/517 |
| 2001/0033607 | A1 * | 10/2001 | Fleming et al. ............... 375/150 |
| 2004/0072582 | A1 | 4/2004 | Aljadeff et al. |
| 2005/0156777 | A1 * | 7/2005 | King et al. ...................... 342/29 |
| 2006/0061505 | A1 * | 3/2006 | Kinghorn .................... 342/25 A |
| 2007/0069739 | A1 * | 3/2007 | Quan ............................. 324/622 |
| 2007/0217379 | A1 * | 9/2007 | Fujiwara et al. .............. 370/338 |

FOREIGN PATENT DOCUMENTS

| KR | 1020050121445 | 12/2005 |
| KR | 1020070011049 | 1/2007 |
| KR | 1020070029543 | 3/2007 |

OTHER PUBLICATIONS

Efficient Low-Complexity Ranging Algorithm for Low Rate UWV Systems, IEEE GLOBECOM 2006 Proceedings, by Yungil Kim et al.*

* cited by examiner

*Primary Examiner* — Ayaz Sheikh
*Assistant Examiner* — Hai-Chang Hsiung
(74) *Attorney, Agent, or Firm* — F. Chau and Associates, LLC

(57) ABSTRACT

A mobile communication system, including: first and second nodes, wherein the first node includes: a first transmitter and a first receiver, and wherein the second node includes: a second receiver receiving a ranging signal from the first transmitter; a frequency synthesizer generating an internal signal in response to a sensing of the reception of the ranging signal; a digital circuit calculating a beat frequency by comparing the ranging signal to the internal signal and evaluating a time lapse from the reception of the ranging signal until the sensing of the reception of the ranging signal by using the beat frequency, wherein the time lapse is part of a response time of the second node; and a second transmitter providing the first receiver with the ranging signal that includes the response time of the second node.

16 Claims, 10 Drawing Sheets

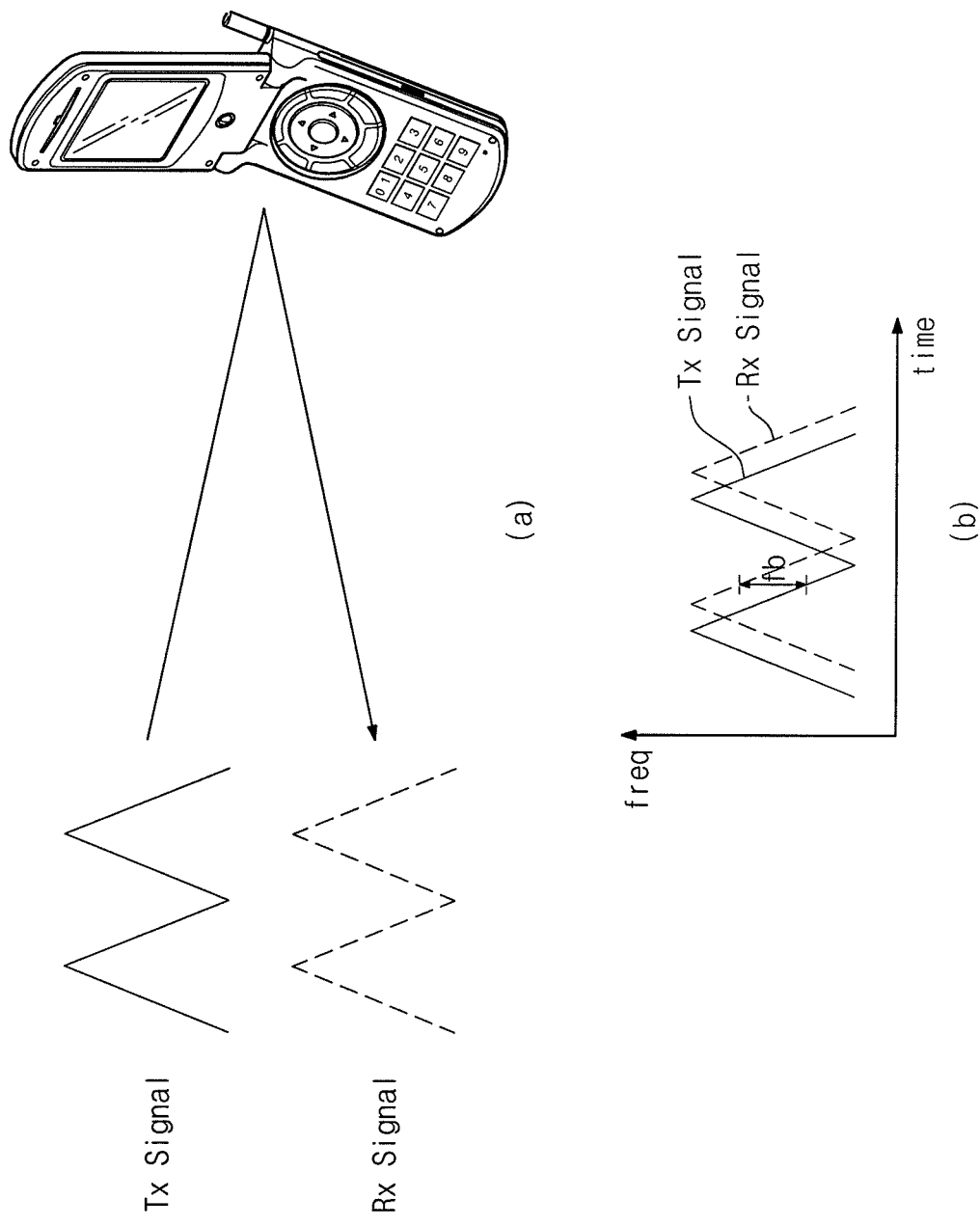

MOBILE COMMUNICATION SYSTEMS AND RANGING METHODS THEREOF

CROSS-REFERENCE TO RELATED APPLICATION

This U.S. non-provisional patent application claims priority under 35 U.S.C. §119 to Korean Patent Application No. 10-2007-96337 filed on Sep. 21, 2007, the disclosure of which is incorporated by reference herein in its entirety.

BACKGROUND

1. Technical Field

The present invention relates to mobile communication systems and ranging methods thereof.

2. Discussion of the Related Art

Mobile communication devices, such as cell phones or personal digital assistants, enable users or subscribers to wirelessly connect with a communications network. In addition to voice or data communication capabilities, mobile communication devices may come equipped with supplemental functions such as reception for digital multimedia broadcasting (DMB), positioning, and so forth. Positioning (i.e., determining where a mobile communication device is located) can be used in a variety of applications. For example, positioning may be utilized in cases where people (including criminals) are missing.

For accurate positioning, distances are ranged in high fidelity. There are several known ranging techniques, some of which employ, e.g., Received-Signal Strength (RSS) and Time-Of-Arrival (TOA) modes. In the RSS mode, a distance is found from the strength (or energy level) of a received signal that is reflected off an object. For example, if the strength of the received signal is strong, the object is detected as being near the reception site, and if the received signal is weak, the object is detected as being apart therefrom.

In the TOA mode, a distance is obtained from an arrival time of a received signal that is reflected off an object. For example, a shorter arrival time indicates the object is near the reception site, while a longer arrival time indicates the object is far therefrom. Generally, the TOA mode provides higher accuracy for positioning or ranging than the RSS mode.

General standards for local wireless networks include wireless local area network (WLAN), Bluetooth, and ZigBee, for example. These wireless communication standards are generally not suited for the TOA mode because they have a weak resolution rate in the time domain. Time resolution means the minimum size of a signal distinguishable in the time domain. For this reason, most standards for wireless communication are adapting the RSS mode. However, as aforementioned, the RSS mode is inferior to the TOA mode in accuracy. Further, in general, the wireless communication standards are not adjusted to accommodate ranging a communication distance with high accuracy or resolvability. Therefore, a need exists for a technique capable of providing a highly accurate ranging.

SUMMARY OF THE INVENTION

An exemplary embodiment of the present invention is a mobile communication system including first and second nodes. The first node includes a first transmitter and a first receiver. The second node is comprised of: a second receiver receiving a ranging signal from the first transmitter; a frequency synthesizer generating an internal signal in response to a sensing of the reception of the ranging signal; a digital circuit calculating a beat frequency by comparing the ranging signal to the internal signal and evaluating a time lapse from the reception of the ranging signal until the sensing of the reception of the ranging signal by using the beat frequency, wherein the time lapse is part of a response time of the second node; and a second transmitter providing the first receiver with the ranging signal that includes the response time of the second node.

The first node further includes a digital circuit evaluating a distance between the first and second nodes by using a round-trip time of the ranging signal.

The round-trip time is a sum of a time it takes the second node to receive the ranging signal from the first node, a time it takes the first node to receive the ranging signal from the second node and the response time of the second node.

The response time is a time it takes until the ranging signal is transmitted to the first receiver after the reception of the ranging signal at the second node.

The response time is a sum of the time lapse from the reception of the ranging signal transmitted from the first transmitter until the sensing of the reception of the ranging signal at the second node and a time lapse from the sensing of the reception of the ranging signal at the second node until the ranging signal is transmitted to the first receiver.

The internal signal is generated in a linear frequency modulation mode by the frequency synthesizer of the second node.

The beat frequency is proportional to the time lapse from the reception of the ranging signal transmitted from the first transmitter until the sensing of the reception of the ranging signal at the second node.

The frequency synthesizer includes: a linear frequency modulation generator generating a linear frequency modulation signal; and an oscillator generating the internal signal in response to an output of the linear frequency modulation generator.

An exemplary embodiment of the present invention is a ranging method of a mobile communication system. The ranging method is comprised of: transmitting a ranging signal from a first node to a second node; generating an internal signal in the second node in response to a sensing of a reception of the ranging signal; calculating a beat frequency by comparing the ranging signal to the internal signal and evaluating a time lapse from the reception of the ranging signal until the sensing of the reception of the ranging signal by using the beat frequency, wherein the time lapse is part of a response time of the second node; and providing the first node with the ranging signal that includes the response time of the second node.

The method is further comprised of evaluating a distance between the first and second nodes by using a round-trip time of the ranging signal.

The round-trip time is a sum of a time it takes the second node to receive the ranging signal from the first node, a time it takes the first node to receive the ranging signal from the second node and the response time of the second node.

The response time is a time lapse until the ranging signal is transmitted to the first node after the reception of the ranging signal at the second node.

The response time is a sum of the time lapse from the reception of the ranging signal transmitted from the first node until the sensing of the reception of the ranging signal at the second first node and a time lapse from the sensing of the reception of the ranging signal at the second node until the ranging signal is transmitted to the first node.

The internal signal is generated in a linear frequency modulation mode by a frequency synthesizer of the second node.

The beat frequency is proportional to the time lapse from the reception of the ranging signal transmitted from the first node until the sensing of the reception of the ranging signal at the second node.

The internal signal is generated by: generating a linear frequency modulation signal in a linear frequency modulation generator of a frequency synthesizer of the second node; and generating the internal signal in response to an output of the linear frequency modulation generator.

An exemplary embodiment of the present invention is a ranging method of a mobile communication system, which is comprised of: transmitting a first packet, which includes a low frequency modulation signal, from a first node to a second node; generating a low frequency modulation signal in the second node in response to a sensing of a reception of the first packet; calculating a beat frequency by comparing the low frequency modulation signal of the first packet to the low frequency modulation signal of the second node; measuring a time lapse from the reception of the first packet until the sensing of the reception of the first packet by using the beat frequency, wherein the time lapse is part of a response time of the second node; and transmitting a second packet, which includes the response time of the second node, from the second node to the first node.

The first packet further comprises a selection bit that indicates the first packet is set to operate in a ranging mode.

BRIEF DESCRIPTION OF THE DRAWINGS

The above and other features of the present invention will become more apparent by describing in detail exemplary embodiments thereof with reference to the accompanying drawings in which:

FIG. 3 shows a theoretical high-resolution time measurement in a linear frequency modulation (LFM) mode;

DETAILED DESCRIPTION OF EXEMPLARY EMBODIMENTS

Figure 1:
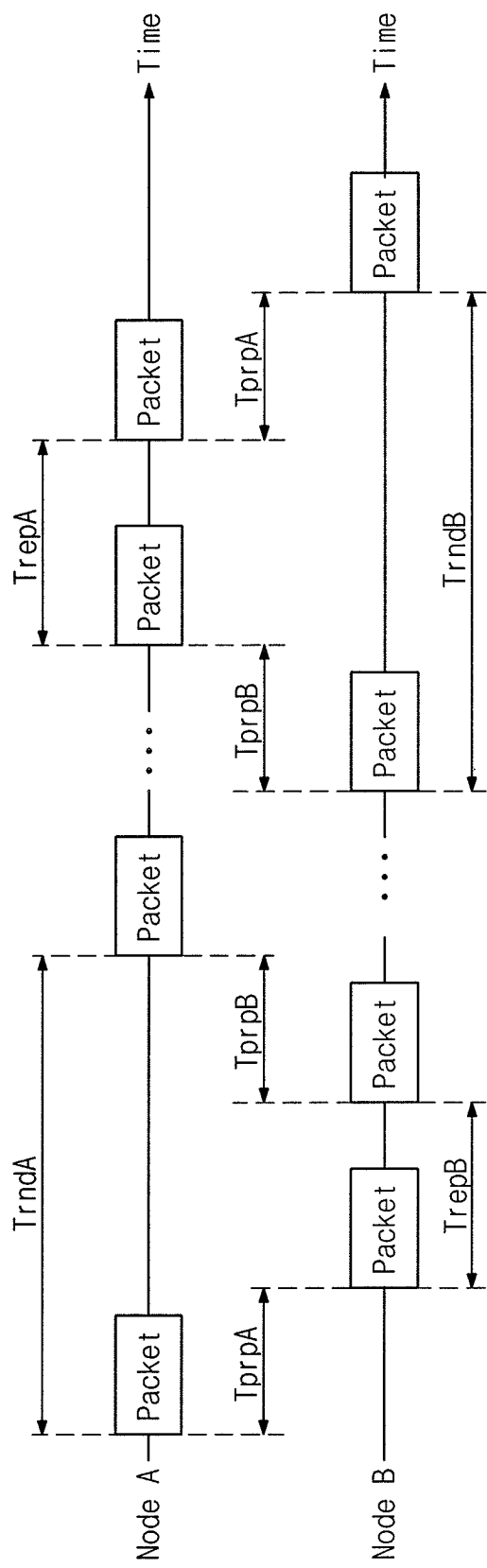
FIG. 1 shows a ranging method in a Symmetrical Double-Sided Two-Way Ranging (SDS-TWR) mode.

Exemplary embodiments of the present invention will be described more fully hereinafter with reference to the accompanying drawings. The present invention may, however, be embodied in many different forms and should not be construed as limited to the embodiments set forth herein. Like reference numerals refer to like elements throughout the accompanying drawings.

In ranging a distance to a mobile communication device, a Symmetrical Double-Sided Two-Way Ranging (SDS-TWR) mode, is generally employed. In the SDS-TWR mode, a distance (or interval) between two nodes is calculated by way of the Time-Of-Arrival (TOA) technique. In other words, a distance between two nodes is obtained by measuring a round-trip time (Trnd) for transmitting and receiving a signal (i.e., a ranging signal).

FIG. 1 shows a ranging method in an SDS-TWR mode. Referring to FIG. 1, in the SDS-TWR mode, a distance is ranged by transceiving a packet (including a ranging signal) between two nodes A and B. In the exemplary embodiments of the present invention, the nodes indicate mobile communication devices or terminals, but they are not limited thereto. For instance, the nodes may indicate a base station.

As illustrated in FIG. 1, a propagation time TprpA is defined as a time for transferring a packet from the node A to the node B. A propagation time TprpB is defined as a time for transferring a packet from the node B to the node A. A packet is transferred therebetween at the velocity of light, so a distance between the nodes is proportional to the propagation time. Equation 1 generally defines a relationship between a propagation time and a distance between nodes.

$$d = Tprp * c \qquad \text{[Equation 1]}$$

In Equation 1, Tprp is a propagation time, d is a distance between the nodes, and c is the velocity of light. Thus, a distance between the nodes, d, can be correctly evaluated from an accurate value of the propagation time Tprp.

As shown in FIG. 1, the node A transmits a packet to the node B. The node A receives a packet that is transmitted from the node B. Thus, the node A is able to find a time TrndA lapsing until a transmitted packet returns thereto. TrndA is called a round-trip time. The round-trip time TrndA is a sum of the propagation times TprpA and TprpB and a response time TrepB. The response time TrepB means a time lapsing from reception until transmission of a packet by the node B. The propagation time Tprp is obtained by subtracting the response time TrepB from the round-trip time TrndA. Here, it is assumed that the propagation time TprpA is the same as the propagation time TprpB (i.e., TprpA=TprpB=Tprp). A value of the propagation time Tprp is given by $$Tprp = \frac{TrndA - TrepB}{2} \qquad \text{[Equation 2]}$$

In Equation 2, Tprp denotes a propagation time, TrndA denotes a round-trip time of the node A, and TrepB denotes a response time of the node B. The round-trip time TrndA can be correctly evaluated by the node A. Thus, the propagation time Tprp can be correctly obtained from an accurate evaluation of the response time TrepB. The response time TrepB is found by the node B. Further, in the same manner, the round-trip time TrndB can be also evaluated by the node B. An average of the round-trip times TrndA and TrndB, evaluated by the nodes A and B, contributes to reduce a ranging error in a mobile communication system. However, the exemplary embodiments of the present invention will be described with regard to evaluating just the round-trip time TrndA, for convenience.

In the SDS-TWR mode, an accurate time evaluation is conducted to correctly range a distance of communication. Since signals transmitted in accordance with general wireless local area network (WLAN) standards have low frequency bandwidths, this causes weak time resolution and hence induces a distance error from several meters to ten meters. As aforementioned, the SDS-TWR mode operates to enhance the ranging accuracy by time resolution. For instance, a time error of 1 ns (1 GHz) causes a distance error of 30 cm. A time error of 10 ns (100 GHz) causes a distance error of 3 m. The rule of Cramer-Rao Lower Bound (CRLB) may be invoked for defining the ranging error, as shown in Equation 3.

$$\sqrt{\mathrm{Var}(d)} \geq \frac{c}{2\sqrt{2}\,\pi\sqrt{SNR}\,\beta} \quad \text{[Equation 3]}$$

In Equation 3, d is a distance between two nodes, c is the velocity of light, SNR is a signal-to-noise ratio, and β is a bandwidth. Referring to Equation 3, assuming that SNR is constant, a larger bandwidth β contributes to raise the accuracy of ranging a distance between two nodes. However, a bandwidth of the general WLAN standard is relatively small. For example, WLAN operates in 22 MHz, Bluetooth operates in 1 MHz, and ZigBee operates in 2 MHz. Therefore, the general WLAN standard does not accurately range a distance between two nodes in high resolution.

Figure 2A:
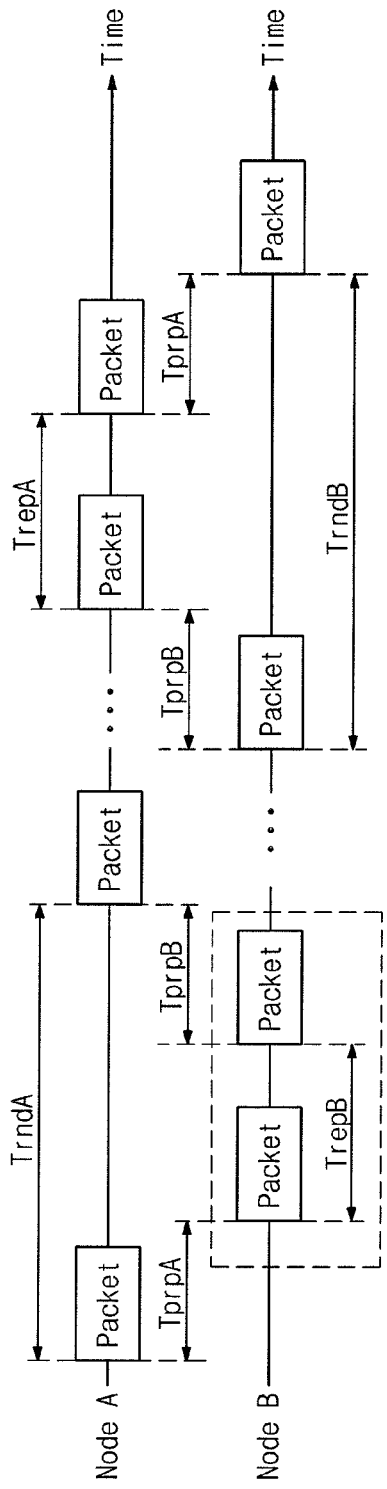
FIGS. 2A and 2B show a ranging method in the SDS-TWR mode in a general wireless Local Area Network (WLAN) standard.
Figure 2B:
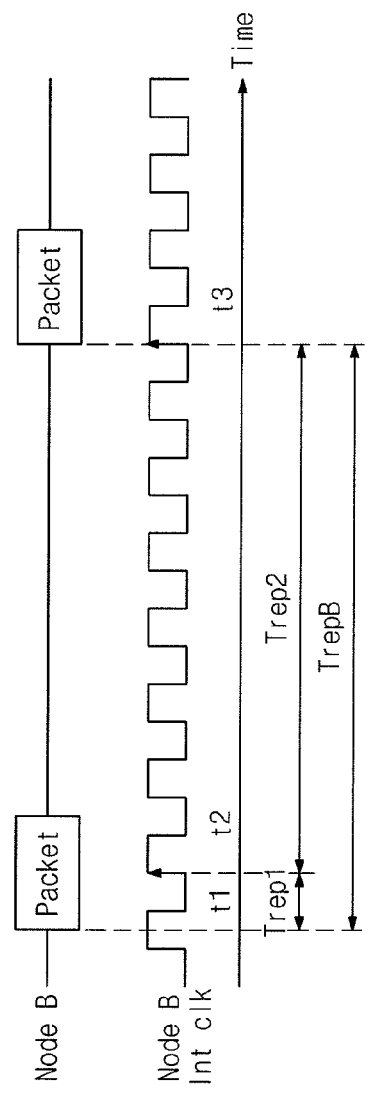

FIGS. 2A and 2B show a ranging method in the SDS-TWR mode in a general WLAN standard. FIG. 2A illustrates an overall scheme of ranging a distance in the SDS-TWR mode. FIG. 2B details the dotted part of FIG. 2A.

As aforementioned, a correct evaluation of the response time TrepB is obtained to accurately range a distance between two nodes in a mobile or wireless communication environment. Referring to FIG. 2B, the response time TrepB is a sum of Trep1 and Trep2. Trep1 is defined as a time lapsing from arrival until response of the arrival by the node B. As shown in FIG. 2B, while a packet arrives at the node B at a time t1, the node B senses the arrival of the packet at a time t2 in response to a rising edge of an internal clock in the node B. Thus, Trep1 may not be correctly evaluated because the packet does not operate in sync with the internal clock of the node B. Meanwhile, Trep2 is defined as a time lapsing from the packet arrival response time t2 at the node B until a packet transmission time t3 to the node A. Trep2 can be correctly evaluated because it operates in sync with the internal clock of the node B. Therefore, a correct value of Trep1 is to be found to obtain an accurate value of the response time TrepB. In the exemplary embodiments of the present invention, an accurate value of Trep1 is obtained in a linear frequency modulation (LFM) mode. A theoretical high-resolution time measurement in the LFM mode will be described in conjunction with FIG. 3.

FIG. 3 shows a theoretical high-resolution time measurement in an LFM mode. LFM is used by Frequency-Modulated Continuous Wave (FMCW) radar, for example. The FMCW radar is designed to continuously transmit an LFM signal. In FIG. 3($a$), the solid line denotes a transmitted signal while the dotted line denotes a received signal that is reflected or dispersed off objects. There is shown a beat frequency fb in FIG. 3($b$). It is well known that the beat frequency fb is proportional to a distance between nodes. Thus, it is possible to accurately obtain a distance between two nodes by correctly measuring the beat frequency fb. Since the beat frequency fb can be correctly evaluated even in a narrow frequency bandwidth, the beat frequency fb is applicable to a general standard of mobile communication.

Figure 4:
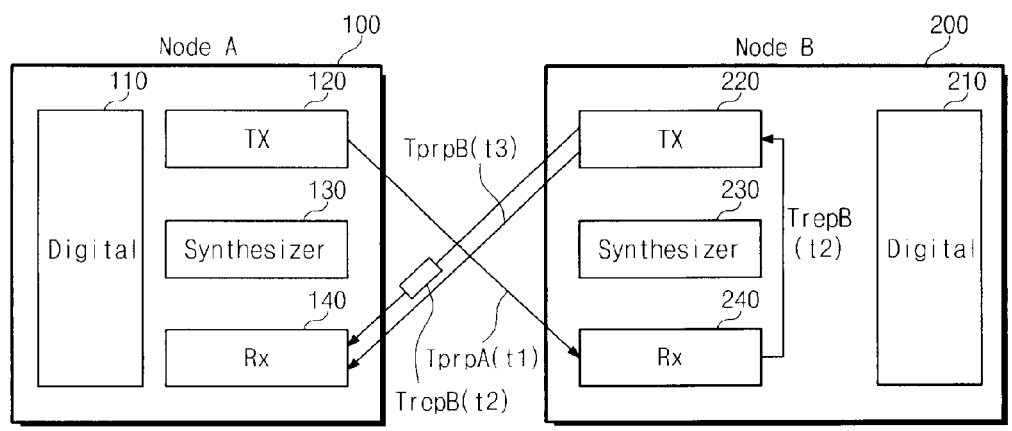
FIG. 4 is a block diagram of a mobile communication system according to an exemplary embodiment of the present invention.

FIG. 4 is a block diagram of a mobile communication system according to an exemplary embodiment of the present invention. Each node 100 or 200 (i.e., the node A or B) is comprised of a digital circuit 110 or 210, a transmitter (TX) 120 or 220, a frequency synthesizer 130 or 230, and a receiver 140 or 240. As aforementioned, a round-trip time of a signal is measured to evaluate a distance between the nodes 100 and 200 (i.e., between the nodes A and B).

In FIG. 4, the arrows denote signal flows. A signal output from the transmitter 120 of the node A arrives at the receiver 240 of the node B after the propagation time TprpA. The node B transfers the signal through the transmitter 220 after the response time TrepB. The signal from the transmitter 220 of the node B arrives at the receiver 140 of the node A. Then, a round-trip time of the signal results from summing the propagation times TprpA and TprpB and the response time TrepB.

Figure 5:
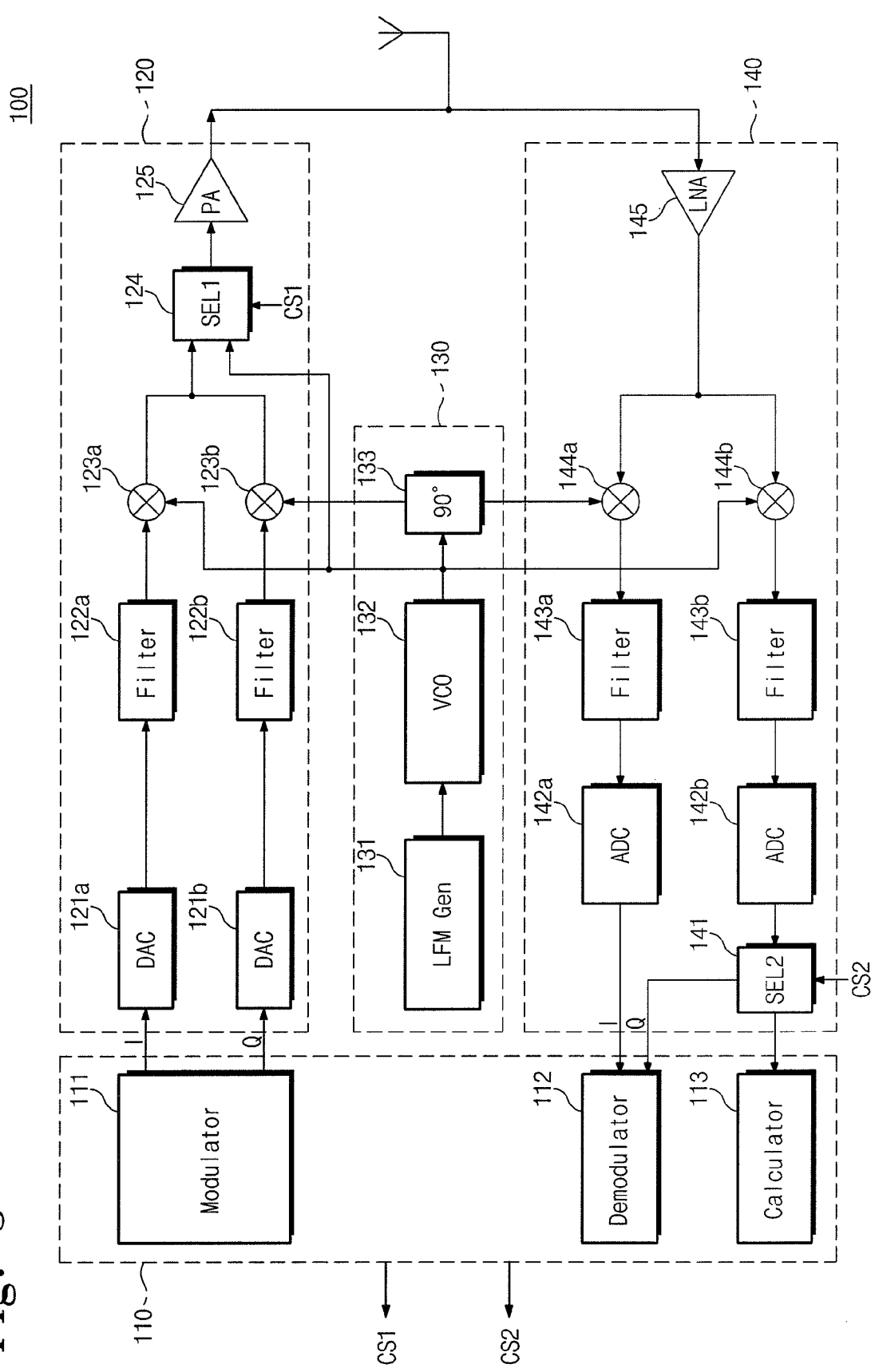
FIG. 5 is a detailed diagram of a node A shown in FIG. 4 according to an exemplary embodiment of the present invention.

FIG. 5 is a detailed diagram of the node A (or 100) shown in FIG. 4 according to an exemplary embodiment of the present invention. Since the nodes A and B (100 or 200) are similar to each other in architecture, only the node A (i.e., 100) will be described for brevity.

Referring to FIG. 5, the digital circuit 110 is comprised of a modulator 111, a demodulator 112, and a calculator 113. The modulator 111 outputs signals I and Q. The transmitter 120 includes digital-analog converters (DACs) 121$a$ and 121$b$, filters 122$a$ and 122$b$, mixers 123$a$ and 123$b$, a first selector 124, and a power amplifier (PA) 125. The DACs 121$a$ and 121$b$ operate to convert digital signals into analog signals. The filters 122$a$ and 122$b$ select a frequency range in which a transmission signal is included. The mixer 123$a$ synthesizes an output of a voltage-controlled oscillator (VCO) 132 with a signal that has passed through the filter 122$a$. The mixer 123$b$ synthesizes a signal, which has passed through the filter 122$b$, with a signal that is shifted by 90° in phase from an output of the VCO 132. The first selector 124 operates to selectively connect outputs of the mixers 123$a$ and 123$b$ or an output of the VCO 132 to the power amplifier 125. The power amplifier 125 operates to amplify and transmit an output of the first selector 124 to an antenna.

The frequency synthesizer 130 includes an LFM generator 131, the VCO 132, and a phase shifter 133. The LFM generator 131 operates to generate a triangular wave for driving the VCO 132. Whereas the LFM generator 131 is embodied as generating a triangular wave, the present invention may not be restricted thereto. The VCO 132 generates an oscillation signal in response to an output of the LFM generator 131. The phase shifter 133 operates to shift a phase of the oscillation signal by 90°. A phase-shifted oscillation signal is transferred to the mixers 123$b$ and 144$a$ respective to the transmitter 120 and the receiver 140.

The receiver 140 includes a second selector 141, analog-digital converters 142$a$ and 142$b$, filters 143$a$ and 143$b$, mixers 144$a$ and 144$b$, and a low noise amplifier (LNA) 145. A signal received by the antenna is amplified by the LNA 145. An output of the LNA 145 is applied to the mixers 144$a$ and 144$b$. The mixer 144$b$ synthesizes an output of the LNA 145 with an output of the VCO 132. The mixer 144$a$ synthesizes an output of the LNA 145 with a signal that is shifted from an output of the VCO 132 by 90° in phase. Outputs of the filters 143$a$ and 143$b$ are supplied into the ADCs 142$a$ and 142$b$. The ADCs 142$a$ and 142$b$ operate to convert analog signals into digital signals. An output of the ADC 142$a$ is applied to the demodulator 112. An output of the ADC 142$b$ is applied to the demodulator 112 or the calculator 113.

Figure 6:
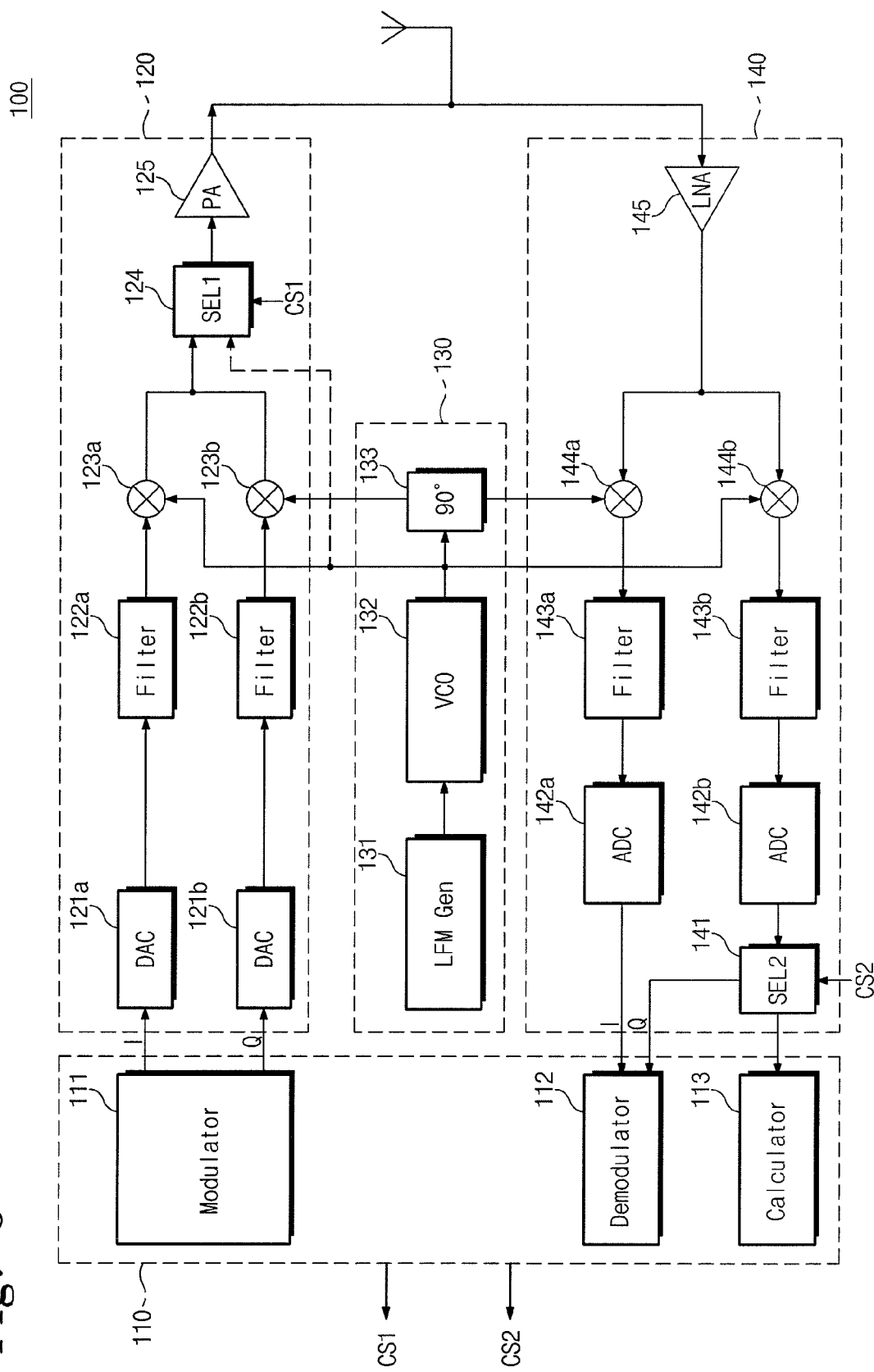
FIG. 6 illustrates an operation route of a ranging unit according to an exemplary embodiment of the present invention in a normal mode.

FIG. 6 illustrates an operation route of a ranging unit according to an exemplary embodiment of the present invention in a normal mode. The normal mode means a mode for conducting normal data transception. While FIG. 6 shows a single node, both nodes 100 and 200 are similar to each other in operation.

Referring to FIG. 6, the operation route is indicated by solid lines with arrows. First, an operation for transmitting a packet to the node B from the node A is described. The signals I and Q output from the modulator 111 pass through the DACs 121a and 121b and the filters 122a and 122b, respectively. The signal I is mixed with an output of the VCO 132, while the signal Q is mixed with a signal that is shifted from the output of the VCO 132 in phase by 90°. Outputs of the mixers 123a and 123b are transferred into the power amplifier 125 by way of the first selector 124. The power amplifier 125 operates to amplify and transfer a signal to the antenna.

Next, an operation for receiving a packet from the node A at the node B is described. A signal received through the antenna is amplified by the LNA 145. An output of the LNA 145 is transferred to the mixers 144a and 144b. The mixer 144b synthesizes an output of the VCO 132 with a signal that has passed through the LNA 145. The mixer 144a synthesizes a signal, which has passed through the LNA 145, with a signal that is shifted from an output of the VCO in phase by 90°. The filters 143a and 143b select a frequency range in which a signal to be received is included. Outputs of the filters 143a and 143b are applied to the ADCs 142a and 142b. The ADCs 142a and 142b convert analog signals into digital signals. An output of the ADC 142a is applied to the demodulator 112. An output of the ADC 142b is applied to the demodulator 112 in accordance with control of the second selector 141.

Figure 7:
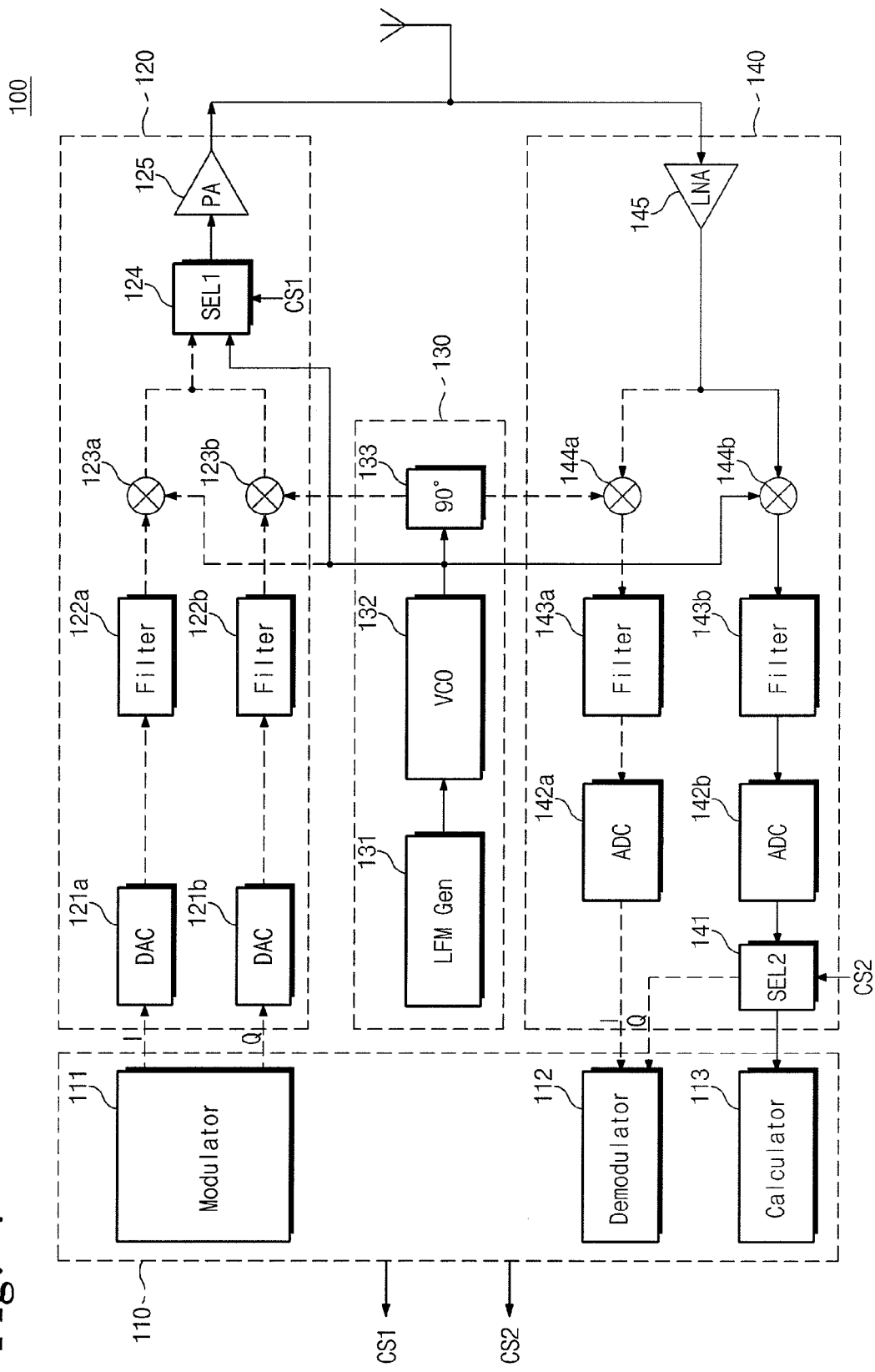
FIG. 7 illustrates an operation route of a ranging unit according to an exemplary embodiment of the present invention in a ranging mode.

FIG. 7 illustrates an operation route of a ranging unit according to an exemplary embodiment of the present invention in a ranging mode. In the ranging mode, the ranging unit measures a distance between the nodes A and B.

Referring to FIG. 7, the operation route is illustrated by solid lines. First, a procedure of transmitting a packet to the node B from the node A is described. The LFM generator 131 operates to generate a triangular wave for driving the VCO 132. Whereas the LFM generator 131 is embodied as generating a triangular wave, the present invention may not restricted thereto. For example, the LFM generator 131 can make various wave patterns. The VCO 132 generates an oscillation signal in response to an output of the LFM generator 131. The oscillation signal is applied to the power amplifier 125 by way of the first selector 124. The power amplifier 125 operates to amplify and transfer a signal to the antenna.

Next, an operation for receiving a packet from the node A at the node B is described. A signal received through the antenna is amplified by the LNA 145. An output of the LNA 145 is transferred to the mixers 144a and 144b. The mixer 144b synthesizes an output of the VCO 132 with a signal that has passed through the LNA 145. The filter 144b selects a frequency range in which a signal to be received is included. The ADC 142b converts analog signals into digital signals. An output of the ADC 142b is applied to the calculator 113 by way of the second selector 141. The calculator 113 operates to calculate the beat frequency fb with reference to the output of the ADC 142b. As aforementioned, the response time Trep1 can be accurately found because the beat frequency fb is proportional to time. For example, if the beat frequency fb is 20 MHz, the response time Trep1 may be 50 µS. As such, by differentiating operation routes of the transceiving and ranging modes from each other, the ranging unit is able to correctly evaluate a distance between two nodes by means of LFM. But, to differentiate a normal data transceiving mode from the ranging mode, a packet contains additional information. Such a packet structure will be described with reference to FIGS. 8A and 8B.

Figure 8A:
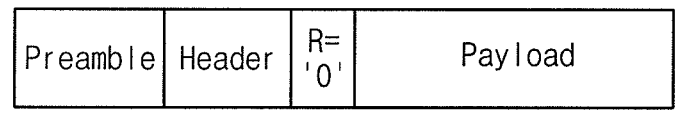
FIGS. 8A and 8B show data packet structures according to an exemplary embodiment of the present invention.
Figure 8B:
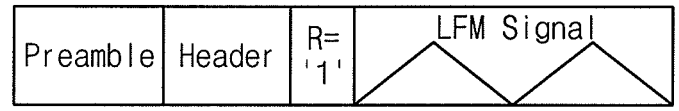

FIGS. 8A and 8B show data packet structures according to an exemplary embodiment of the present invention.

A general structure of packet is composed by including a preamble, a header, and a payload. According to an exemplary embodiment of the present invention, the header includes a selection bit R. The selection bit R is provided to select one of the normal and ranging modes. As illustrated in FIG. 8A, if the selection bit R is '0', the packet is set to operate in the normal mode. If the selection bit R is '1', as illustrated in FIG. 8B, the packet is set to operate in the ranging mode.

Figure 9A:
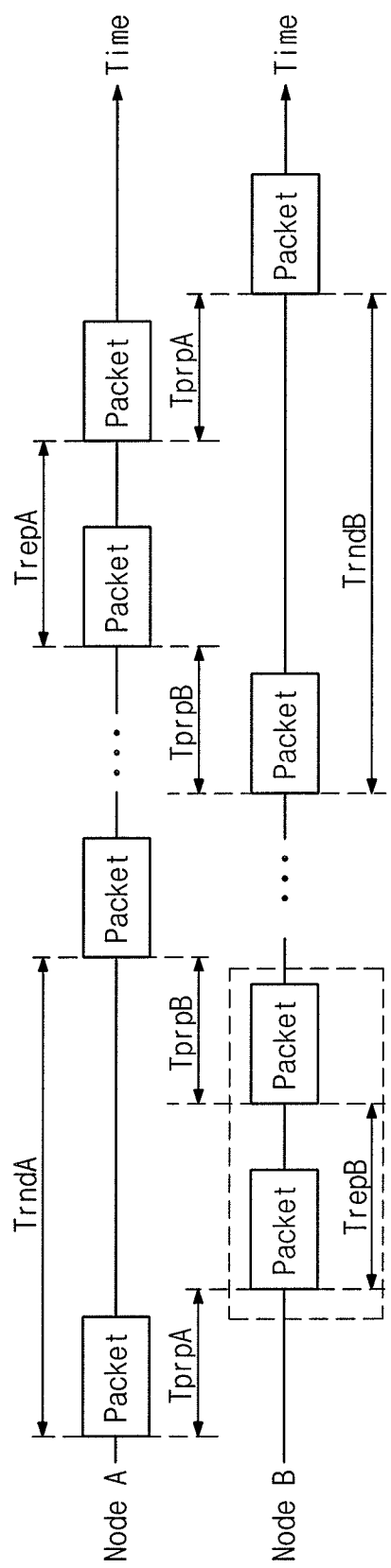
FIGS. 9A and 9B illustrate a ranging method according to an exemplary embodiment of the present invention.
Figure 9B:
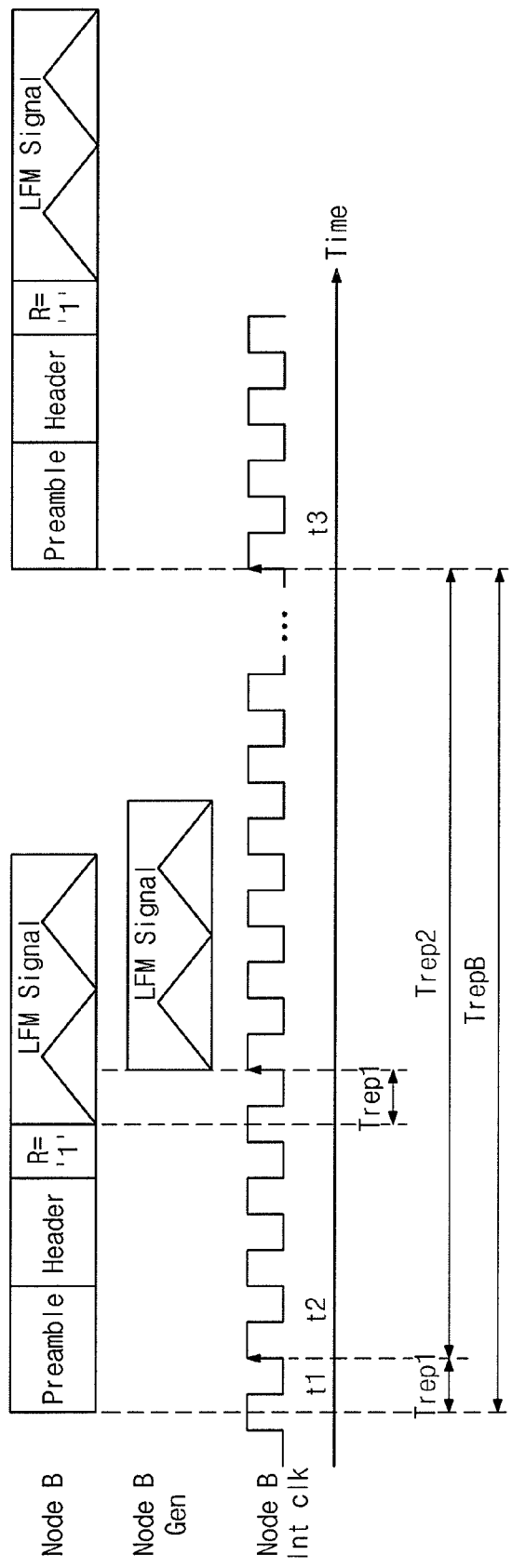

FIGS. 9A and 9B illustrate a ranging method according to an exemplary embodiment of the present invention.

Referring FIG. 9A, for ranging a distance between the nodes A and B, the node A transmits a packet, which includes an LFM signal, to the node B. The node B receives the packet after the propagation time TprpA. FIG. 9B details the dotted part of FIG. 9A. Referring to FIG. 9B, the node B receives the packet at the time t1, but it senses the arrival of the packet at the time t2. If the selection bit R of the received packet is '1', the node B generates an LFM signal by itself. As shown in FIG. 9B, there is a gap by Trep1 between an LFM signal, which is received at the node B, and the LFM signal that is generated from the node B. During this, the time gap Trep1 can be correctly found from the beat frequency fb. The time Trep2 can also be exactly found because it operates in sync with the internal clock thereof. As a result, the node B is able to evaluate the response time TrepB accurately.

In accordance with an exemplary embodiment of the present invention, a round-trip time of a signal is precisely determined to range a distance between two nodes. The round-trip time of the signal is a sum of two propagation times and a response time. The round-trip time is made precise by correctly calculating the response time. This is accomplished by measuring a beat frequency between two LFM signals at the node first receiving the signal. The response time is transmitted to the other node and is used for evaluating the round-trip time.

In obtaining a round-trip time, in accordance with an exemplary embodiment of the present invention, a distance to a mobile communication device in a wireless communication environment can be accurately ranged.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile communication system, comprising:
   first and second nodes,
   wherein the first node comprises: a first transmitter and a first receiver, and
   wherein the second node comprises:
   a second receiver receiving a ranging signal from the first transmitter, wherein the ranging signal is generated by linear frequency modulation;
   a frequency synthesizer generating an internal signal by linear frequency modulation in response to a sensing of the reception of the ranging signal;
   a digital circuit calculating a beat frequency by comparing the ranging signal to the internal signal and evaluating a time lapse from the reception of the ranging signal until the sensing of the reception of the ranging signal by using the beat frequency, wherein the time lapse is part of a response time of the second node; and
   a second transmitter providing the first receiver with the ranging signal and the response time of the second node,
   wherein a packet, which is transmitted from the first node to the second node and includes the ranging signal, further includes a selection bit that indicates the packet is set to operate in a ranging mode.

2. The mobile communication system as set forth in claim 1, wherein the first node further comprises:

a digital circuit evaluating a distance between the first and second nodes by using a round-trip time of the ranging signal.

3. The mobile communication system as set forth in claim 2, wherein the round-trip time is a sum of a time it takes the second node to receive the ranging signal from the first node, a time it takes the first node to receive the ranging signal from the second node and the response time of the second node.

4. The mobile communication system as set forth in claim 1, wherein the response time is a time it takes until the ranging signal is transmitted to the first receiver after the reception of the ranging signal at the second node.

5. The mobile communication system as set forth in claim 4, wherein the time it takes until the ranging signal is transmitted to the first receiver after the reception of the ranging signal at the second node is a sum of the time lapse from the reception of the ranging signal transmitted from the first transmitter until the sensing of the reception of the ranging signal at the second node and a time lapse from the sensing of the reception of the ranging signal at the second node until the ranging signal is transmitted to the first receiver.

6. The mobile communication system as set forth in claim 1, wherein the internal signal is generated in a linear frequency modulation mode by the frequency synthesizer of the second node.

7. The mobile communication system as set forth in claim 1, wherein the beat frequency is proportional to the time lapse from the reception of the ranging signal transmitted from the first transmitter until the sensing of the reception of the ranging signal at the second node.

8. The mobile communication system as set forth in claim 1, wherein the frequency synthesizer comprises:
a linear frequency modulation generator generating a linear frequency modulation signal; and
an oscillator generating the internal signal in response to an output of the linear frequency modulation generator.

9. A ranging method of a mobile communication system, comprising:
transmitting a ranging signal from a first node to a second node, wherein the ranging signal is generated by linear frequency modulation;
generating an internal signal by linear frequency modulation in the second node in response to a sensing of a reception of the ranging signal;
calculating a beat frequency by comparing the ranging signal to the internal signal and evaluating a time lapse from the reception of the ranging signal until the sensing of the reception of the ranging signal by using the beat frequency, wherein the time lapse is part of a response time of the second node; and
providing the first node with the ranging signal and the response time of the second node,
wherein a packet, which is transmitted from the first node to the second node and includes the ranging signal, further includes a selection bit that indicates the packet is set to operate in a ranging mode.

10. The method as set forth in claim 9, which further comprises:
evaluating a distance between the first and second nodes by using a round-trip time of the ranging signal in the first node.

11. The method as set forth in claim 10, wherein the round-trip time is a sum of a time it takes the second node to receive the ranging signal from the first node, a time it takes the first node to receive the ranging signal from the second node and the response time of the second node.

12. The method as set forth in claim 9, wherein the response time is a time it takes until the ranging signal is transmitted to the first node after the reception of the ranging signal at the second node.

13. The method as set forth in claim 12, wherein the time it takes until the ranging signal is transmitted to the first node after the reception of the ranging signal at the second node is a sum of the time lapse from the reception of the ranging signal transmitted from the first node until the sensing of the reception of the ranging signal at the second node and a time lapse from the sensing of the reception of the ranging signal at the second node until the ranging signal is transmitted to the first node.

14. The method as set forth in claim 9, wherein the internal signal is generated in a linear frequency modulation mode by a frequency synthesizer of the second node.

15. The method as set forth in claim 9, wherein the beat frequency is proportional to the time lapse from the reception of the ranging signal transmitted from the first node until the sensing of the reception of the ranging signal at the second node.

16. The method as set forth in claim 9, wherein the internal signal is generated by:
generating a linear frequency modulation signal in a linear frequency modulation generator of a frequency synthesizer of the second node; and
generating the internal signal in response to an output of the linear frequency modulation generator.

* * * * *